Dec. 14, 1971 R. B. SINGER 3,626,787
CONTINUOUSLY VARIABLE TRANSMISSION
Filed Nov. 24, 1969 4 Sheets-Sheet 1

INVENTOR:
Robert B. Singer
ATTORNEYS

United States Patent Office 3,626,787
Patented Dec. 14, 1971

3,626,787
CONTINUOUSLY VARIABLE TRANSMISSION
Robert B. Singer, Palos Verdes, Calif., assignor to
White Motor Corporation, Cleveland, Ohio
Continuation-in-part of application Ser. No. 711,339,
Mar. 7, 1968. This application Nov. 24, 1969, Ser.
No. 879,390
Int. Cl. F16h 47/04
U.S. Cl. 74—687                                27 Claims

ABSTRACT OF THE DISCLOSURE

Planetary gearing including a ring gear, a planet gear carrier, two sun gears and two corresponding sets of planet gears is combined with a hydraulic transmission means that is reversible in output direction without reversal of input direction and is reversible in direction of power flow. An engine is permanently connected to the hydraulic transmission means and is releasably connected to the ring gear. The hydraulic transmission means is releasably connectable to the ring gear and to the two sun gears individually.

CROSS-REFERENCE TO RELATED APPLICATIONS

This application is a continuation-in-part of my copending application of the same title, Ser. No. 711,339, filed Mar. 7, 1968, and now abandoned.

BACKGROUND OF THE INVENTION

The invention relates to a continuously variable power transmission system of the type set forth in the copending Gunderson et al. U.S. application Ser. No. 531,172 filed Mar. 2, 1966 and later issued as Pat. 3,427,899 and also disclosed in the corresponding French patent Ser. No. 97,074, which disclosure is hereby incorporated into the present disclosure by reference.

The transmission system of the Gunderson et al. disclosure, which is especially suited for tractors includes a hydraulic transmission means comprising a first reversible hydraulic motor-pump and a second reversible hydraulic motor-pump is combined with an input shaft through simple planetary gearing comprising a ring gear, a planet gear carrier and a sun gear. For an initial low speed range, the planet gear carrier is connected to the output shaft and the power from the input shaft is routed through the hydraulic transmission means to both the ring gear and sun gear to accelerate the sun gear in one rotary direction with recirculation of power back to the input side of the hydraulic transmission means. For an intermediate speed range the input shaft delivers power directly to the ring gear and at the same time employs the hydraulic transmission means first to decelerate the sun gear and then to accelerate the sun gear in the opposite direction. For a third speed range, the ring gear is connected to the output shaft and the input shaft delivers power directly to the planet gear carrier while employing the hydraulic transmission means first to decelerate the sun gear and then to accelerate the sun gear in the opposite direction.

The present invention is directed to the problem of improving the above described prior art transmission system in certain desirable respects.

One improvement to be sought is to reduce the number of clutches and clutch operations, as well as to lower the relative clutch speeds. This objective involves the problem of eliminating the need for output clutches, by making it possible to connect the output shaft permanently to one of the components of the planetary gearing. Such an improvement would avoid loading any clutch with the maximum torque and would avoid shifting the output torque from one planetary gear component to another.

With reference to reducing the number of clutch operations it is especially desirable to eliminate the clutch operations that have heretofore been necessary for a transition from the lower half to the upper half of the third speed range. With the necessity for such a transition, the upper half of the third speed range may properly be regarded as a fourth speed range, the present need being, in effect, to reduce four speed ranges to three speed ranges.

Since the purpose of clutch operations in the middle of the third speed range of the prior transmission is to extend the overall speed range by shifting from one gear ratio to a higher gear ratio for the upper end of the range, the problem to be met is to make the third speed range reach substantially the same maximum speed output without the necessity for pausing to step up the gear ratio.

A further problem is to reduce the loading on the gear teeth and especially the loading on the teeth of the planet gears. This problem is closely related to the foregoing problems since the loading on the gear teeth is increased to a maximum when a shift is made to a higher gear ratio in the middle of the third speed range.

With further reference to improvement, the third speed range in the operation of the prior transmission system requires the final steps of reducing the volumetric displacement of the second hydraulic motor-pump to increase the speed ratio between the first and second motor-pump. A further need that is met by the present invention is to eliminate this additional manipulation and to eliminate the resulting steep rise in the hydraulic pressure between the two motor-pumps.

The present invention eliminates two clutches by providing additional planetary gear components and by permanently connecting the output shaft to the planetary gearing.

In the presently preferred embodiment of the invention wherein the planet gear carrier is permanently connected to the output shaft, a second sun gear is added for rotation independently of the first sun gear and a second set of planet gears is mounted on the planet gear carrier to operate in mesh both with the second sun gear and with the first set of planet gears. The addition of these components to the basic planetary gearing are not necessary in the first and second speed ranges and therefore in those stages the additional components spin freely without transmitting power. In the third speed range, however, with the input shaft directly driving the ring gear, a speed increase is accomplished by using the hydraulic transmission means to drive the second sun gear and thereby drive the first set of planet gears by means of the second set of planet gears. Thus, in effect, the speed transmitted to the second sun gear by the hydraulic transmission means is added to the speed that is transmitted to the ring gear by the input shaft to drive the planet gear carrier through a range of speeds higher than the speed of the input shaft. This arrangement extends the third speed range so effectively that it is not necessary to provide for a gear ratio change in the middle of the third speed range.

The new transmission system simplifies the transmission structure since it requires only four clutches and the four clutches may be identical. It simplifies operation of the transmission in that only two transitions by clutch manipulation are required to cover the whole range of ratios of speed output to speed input. Finally, the new transmission system may operate and preferably does operate with a fixed displacement second motor-pump of the hydraulic transmission means.

A second embodiment of the invention adds a master clutch and a conventional speed-change gear box. With the planetary gearing locked up, acceleration of a selected speed in an overall speed range is accomplished by means of the gear box and then the planetary gearing is unlocked to permit the planetary gearing to be manipulated for increasing and decreasing the speed by infinite increments as desired.

The features and advantages of the invention may be understood from the following detailed description and the accompanying drawings:

BRIEF DESCRIPTION OF THE DRAWINGS

In the drawings, which are to be regarded as merely illustrative.

DESCRIPTION OF THE PREFERRED EMBODIMENTS

Since the first embodiment of the invention is characterized by a sequence of modes of operation accomplished by a corresponding sequence of changes in operating connections within the transmission system, an understanding of the invention may be approached by referring to the diagrams in FIGS. 1 to 6 which show the interconnections at different speed ranges in the overall operation of the presently preferred embodiment of the invention.

As shown in FIGS. 1–6, an input shaft 10 is permanently mechanically connected to a first motor-pump 12 which in turn is hydraulically connected to a second motor-pump 14. The two motor-pumps 12 and 14 together constitute an infinitely variable hydraulic transmission means which is reversible in the direction of power flow and is also reversible in output direction without reversal of input direction.

Each of the motor-pumps 12 and 14 is of the axial-piston type and at least the motor-pump 12 has a cylinder block that is tiltable through a range of angles for variation in volumetric displacement, the cylinder block being tiltable past center to reverse the direction of rotation and to vary speed of rotation in the second direction. Thus the motor-pump 12 may be adjusted to actuate the motor-pump 14 at various speeds in either rotary direction and, on the other hand, the second motor-pump 14 may be actuated mechanically to serve as a pump for actuating the first motor-pump 12 in the same manner. A feature of the invention is that there is no need to vary the displacement of the second motor-pump 14 throughout the whole speed range.

The hydraulic transmission means comprising the motor-pumps 12 and 14 is combined with a basic planetary gear assembly having four interacting component means, namely, a sun gear 15, a ring gear 16, a planet gear carrier 18 and a set of planet gears 20 mounted on the planet gear carrier. For input power flow to the ring gear 16, the ring gear is provided with external input teeth 21. In addition to this basic planetary gearing, counterparts of two of the component means are provided. In this particular embodiment of the invention, one additional counterpart component means is a second sun gear 22 and another is a second set of planet gears 24 that is in mesh both with the second sun gear 22 and with the first set of planet gears 20.

The planet gear carrier 18 is permanently connected to the output shaft 25 of the transmission system. The input shaft 10 and the second motor-pump 14 are releasably connected to various parts of the planetary gearing at different stages in the operation of the transmission system. For this purpose four clutches are provided comprising: a first clutch, designated A to releasably connect the second motor-pump 14 to the first sun gear 15 as indicated in FIG. 1; a second clutch, designated B to connect the second motor-pump 14 also to the input teeth 21 of the ring gear 16 as indicated in FIG. 1; a third clutch, designated C to releasably connect the input shaft 10 directly to the input teeth 21 of the ring gear 16 as indicated in FIG. 2; and a fourth clutch designated D to releasably connect the second motor-pump 14 to the second sun gear 22 as indicated in FIG. 4.

Figures 1, 2:
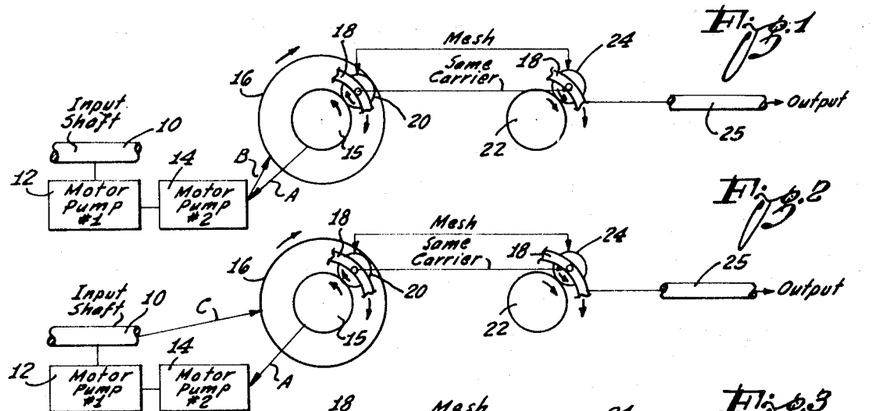
FIGS. 1 to 6 are diagrammatic views based on the presently preferred embodiment of the invention, the views showing the various operating connections in the transmission system at different stages in output speeds.

In the first of low speed range which is represented by FIG. 1 the second motor-pump 14 is connected by clutch A to the first sun gear 15 and is also connected by the clutch B to the input teeth 21 of the ring gear 16 in a manner to cause the sun gear and ring gear to rotate in opposite directions. With the tiltable cylinder block of the second motor-pump 14 constantly adjusted for maximum displacement and with the tiltable cylinder block of the first motor-pump 12 at its center position for zero displacement, the input shaft 10 rotates without transmitting power to the planetary gearing. To start the transmission of power, the cylinder block of the first motor-pump 12 is progressively tilted to accelerate the ring gear 16 clockwise. Power transmitted to the input teeth 21 of the ring gear 16 goes to the output shaft 26 through the planet gear carrier 18 except for a portion of the power which is recirculated through the first sun gear 15 back to the second motor pump 14. The purpose of the recirculation is to provide a greater overall speed ratio between the second motor pump 14 and the output shaft 25 without disturbing the ratio required in the next higher speed range. During this first speed range, the second sun gear 22 and the second set of planetary gears 24 simply spin freely.

At the end of the first or lowest speed range with the first motor-pump 12 operating at full displacement both of the motor-pumps operate at the same speed to make possible transition to the second speed range by overlapping clutch operation without interrupting the application of torque to the output shaft 25. To make this transition, first clutch C is engaged while clutch B is still engaged and then clutch B is disengaged.

Figures 3, 4:
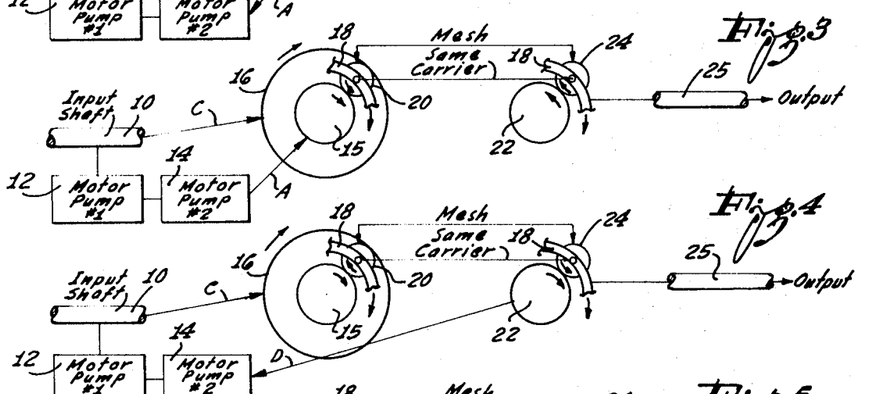

FIG. 2 represents the lower half of the second speed range of the transmission system and FIG. 3 represents the upper half of the second speed range, the two speed ranges differing in the direction of rotation of the first sun gear 15. With the first sun gear 15 rotating counterclockwise at the end of the first speed range, it continues to rotate counterclockwise at high speed at the beginning of the second speed range as shown in FIG. 2 and increase in the speed of the output shaft 25 is accomplished in the second speed range by first progressively decelerating the counterclockwise rotation of the first sun gear to zero and then progressively accelerating the first sun gear in clockwise direction as indicated in FIG. 3. For this purpose the cylinder block angle of the first motor pump 12 is progressively adjusted to progressively decrease the volumetric displacement of the first motor-pump with consequent deceleration of the second motor-pump 14 to zero and then the cylinder block is moved past center to reverse and accelerate rotation of the second motor-pump 14 with corresponding deceleration and reverse acceleration of the first sun gear 15. Throughout this second speed range the second sun gear 22 and the second set of planet gears 24 continue to spin freely.

During the first half of the second speed range in which the counterclockwise rotation of the first sun gear 15 is decelerated, the first sun gear drives the second motor-pump 14 to cause the second motor-pump to function as a pump to actuate the first motor-pump 12 for recirculation of power back to the input side of the transmission. When the rotation of the first sun gear 15 is reversed in the second half of the second speed range that is represented by FIG. 3, the first sun gear 15 opposes the applied torque and, therefore, the second motor-pump 14 changes back from operation as a pump to operation as a motor.

At the end of the second half of the second speed range the first motor-pump 12 again reaches full displacement and again the two motor-pumps 12 and 14 operate at the same speed with the consequence that the first sun gear 15 and the ring gear 16 rotate at the same speed. With the first sun gear 15 and the ring gear 16 operating at the same speed, the first sun gear 15 and the second sun gear 22 rotate at the same speed in the same rotary direction.

With the two sun gears 15 and 22 rotating at the same speed, transition from the second speed range to the higher third speed range is carried out without interruption in torque output by operating clutches D and A in overlapping sequence. Clutch D is engaged while clutch A is still engaged and then clutch A is disengaged. During this transition, the temporary simultaneous engagement of clutches A and D temporarily lock up the planetary gearing to cause the planetary gearing to rotate as a unit.

At this transition stage between the second speed range and a third speed range, the overlapping operation of clutches D and A is made possible because the planetary gear train rotates bodily with all of its components stationary relative to each other. While there is no relative rotation among the components of the planetary gear train, the bodily rotation of the planetary gear train causes rotation of all of the components relative to the rest of the transmission system and this fact explains why the two sun gears rotate in the same direction in this transition stage even though their gear connections cause them to rotate in opposite directions in the first speed range.

Figures 5, 6:
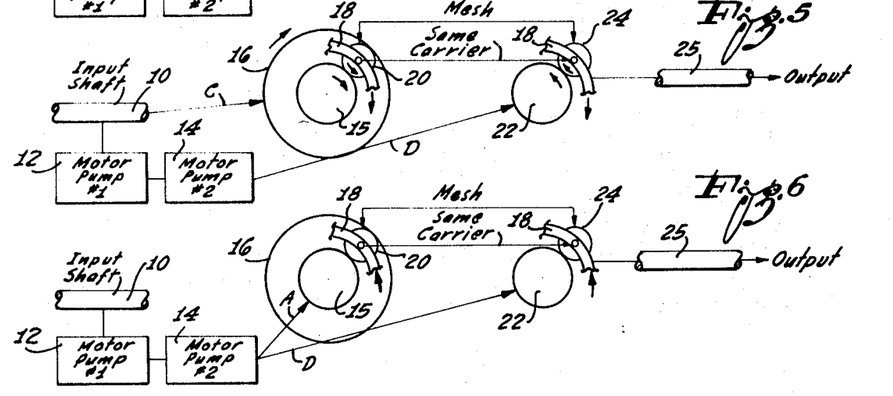

During the first half of the third speed range, the second motor-pump 14 again acts as a pump to recirculate power back to the transmission input through the first motor-pump 12. In the first half of the third speed range with the second sun gear 22 rotating clockwise as indicated in FIG. 4, the volumetric displacement of the first motor-pump 12 is gradually reduced to decelerate the rotation of the second sun gear to zero and then for the second half of the third speed range the cylinder block of the first motor pump 12 is swung past center to accelerate the second sun gear 22 from zero in counterclockwise direction as indicated in FIG. 5. During the second half of the third speed range, the second motor-pump 14 reverts to its function as a motor to drive the second sun gear 22.

The manner in which the third speed range is extended may be understood when it is considered that the input shaft 10 imparts speed through the ring gear 16 to the first set of planet gears 20 for transmission by the planet gears 20 to the planet gear carrier 18 and at the same time the hydraulic means in driving the second sun gear 22 imparts additional speed to the first set of planetary gears 20 through the second set of planetary gears 24. Thus, the first set of planetary gears imparts the sum of the two speeds to the planet gear carrier 18.

Figure 9:
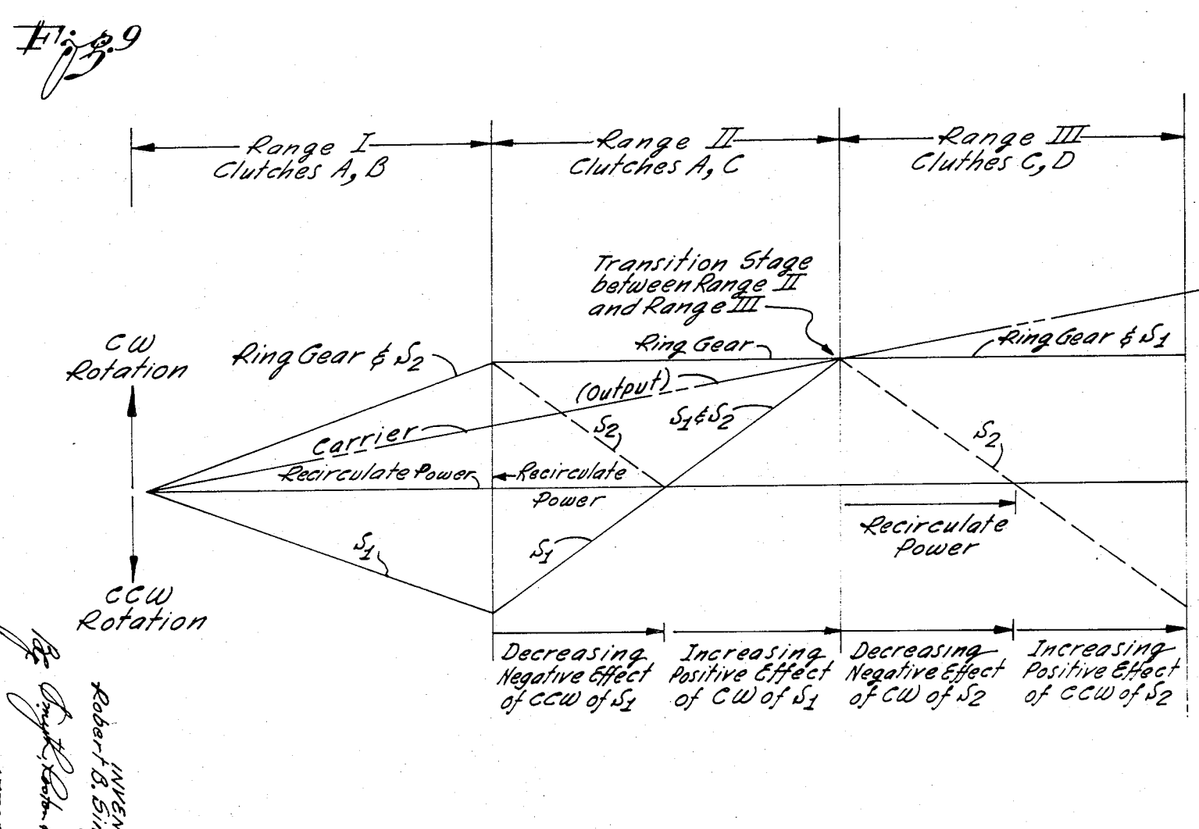
FIG. 9 is a diagram that indicates changes in speed and changes in the direction of rotation of components of the planetary gearing through three ranges of speed.

FIG. 9 is a diagram that shows the changes in speed and the changes in the direction of rotation of the components of the planetary gearing through the above described three ranges of speed, it being assumed for the purpose of explanation that the output member is driven clockwise. During the first speed range when cluches A and B are effective, the first sun gear $S_1$ is accelerated from zero to maximum counterclockwise rotation and the second sun gear $S_2$ along with the ring gear is accelerated clockwise to maximum speed, the ring gear being maintained at its maximum speed by the input member throughout the next two higher speed ranges. In the second speed range when clutches A and C are effective, the oppositely rotating sun gears are decelerated to zero and both are then accelerated clockwise to maximum speed at the end of the second range.

It can be seen in the diagram that at the end of the second speed range all of the components of the planetary gearing rotate synchronously, the planetary gearset rotating as a whole with no relative rotation among its components. The overlapping engagement of the two clutches A and D occurs briefly at this transition stage to momentarily lock up the planetary gearing.

In the third speed range the first sun gear continues to rotate at maximum speed clockwise together with the ring gear and progressive overdrive is accomplished by initially decelerating the sun gear to zero and then progressively accelerating the second sun gear to maximum rotation counterclockwise.

To operate in reverse with high torque, clutches A and B are engaged as indicated in FIG. 1 with the tiltable cylinder block of the first motor-pump 12 at its center position for zero displacement. Then the cylinder block is swung past center for reversal of the directions of rotation that are shown in FIG. 1. The reversed speed may accelerate through the first speed range.

FIG. 6 shows how the transmission may be employed in a different manner for reverse operation. The connections in FIG. 6 provide less output torque but permit the speed range to be extended. With the second motor-pump 14 at its constant full displacement and the first motor-pump 12 adjusted for zero displacement and with the output shaft 25 stationary, clutch A is engaged to connect the second motor-pump 14 to the first sun gear 15 and clutch D is engaged to connect the second motor-pump additionally to the second sun gear 22 with the consequence that the planetary gearing is locked up to rotate as a unit. The cylinder block of the first motor-pump 12 is then swung past center to cause reverse acceleration of the second motor-pump 14 which reversed acceleration is transmitted through the locked planetary gearing to the output shaft 25.

Figures 7, 8:
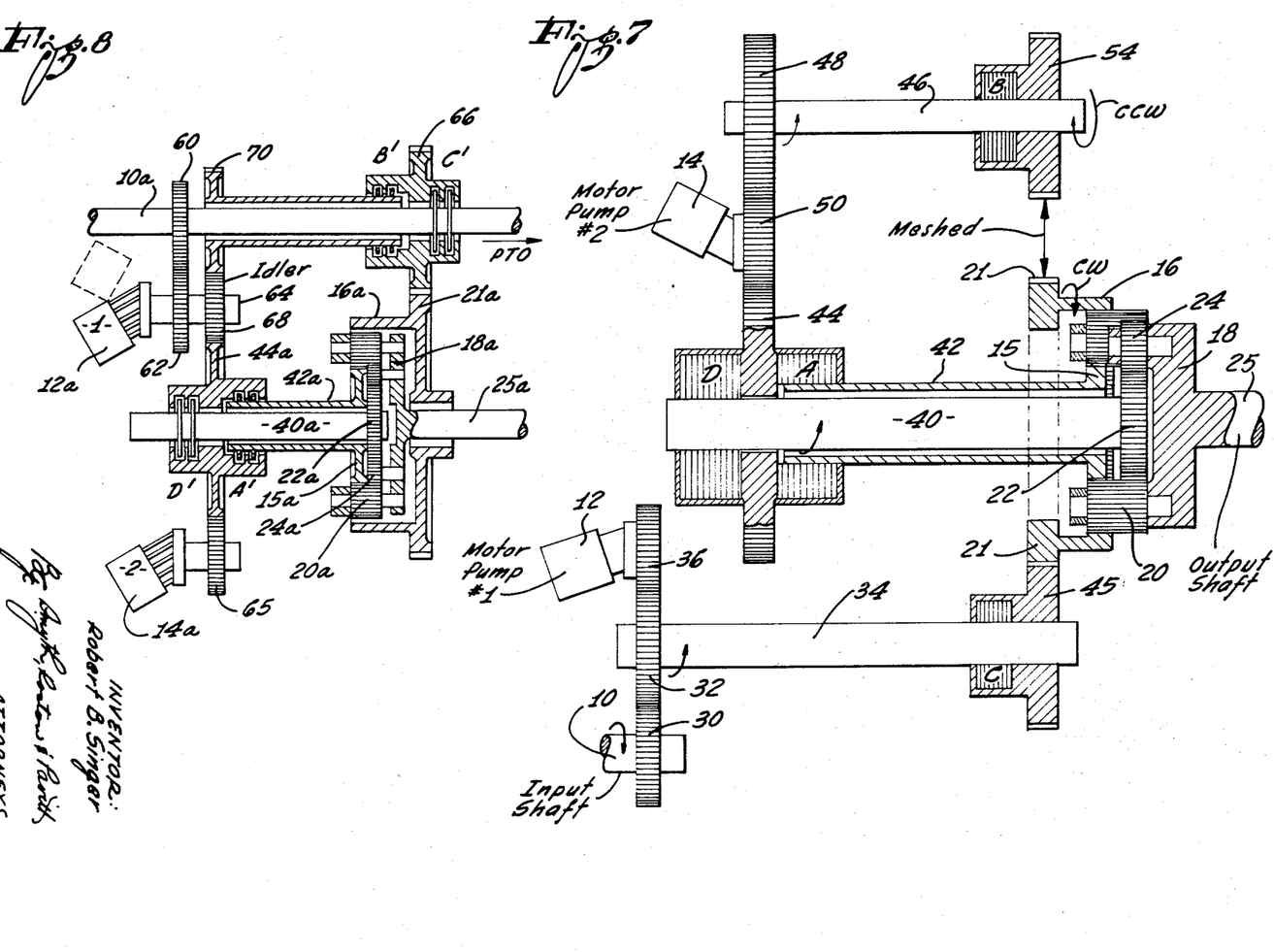
FIG. 7 is a schematic view of the structure of one embodiment of the invention.
FIG. 8 is a view similar to FIG. 7 of the presently preferred embodiment of the invention.

FIG. 7 is a schematic view which provides adequate information about the structure of the presently preferred embodiment of the invention. In FIG. 7 the previously mentioned input shaft 10 is connected by gears 30 and 32 with a first countershaft 34 and the gear 32 cooperates with a gear 36 to connect the previously mentioned first motor-pump 12 to the first countershaft. The previously mentioned second sun gear 22 is carried by a shaft 40 and the previously mentioned first sun gear 15 is carried by a tubular shaft 42 that encloses at least a portion of the shaft 40. The previously mentioned planet gear carrier 18 is united with the output shaft 25.

FIG. 7 shows how a planet gear 20 of the previously mentioned first set of planet gears is in mesh with the first sun gear 15 and is also in mesh with the previously mentioned ring gear 16. FIG. 7 also shows how a planet gear 24 of the second set of planet gears is in mesh with the second sun gear 22. As previously stated the second set of planet gears 24 is in mesh with the first set of planet gears 20 but is not in mesh with the ring gear 16.

The two shafts 40 and 42 are supported by suitable bearings (not shown) and a gear 44 is rotatably mounted on the shaft 40 adjacent the end of the tubular shaft 42. The previously mentioned clutch A is provided to releasably connect the gear 44 to the tubular shaft 42 that carries the first sun gear 15 and the previously mentioned clutch D releasably connects the gear 44 to the inner shaft 40 that carries the second sun gear 22.

A gear 45 is rotatably mounted on the first countershaft 34 in mesh with the input teeth 21 of the ring gear 16 and the previously mentioned clutch C may be engaged to connect the gear 45 to the first countershaft.

A second countershaft 46 fixedly carries a gear 48 in mesh with a gear 50 that is connected to the second motor-pump 14 and the gear 50 is also in mesh with the previously mentioned gear 44.

A gear 54 that is rotatably mounted on the second countershaft 46 is in mesh with the input teeth 21 of the ring gear 16. The previously mentioned clutch B may be operated to connect the gear 54 to the second countershaft 46.

It is apparent in FIG. 7 that the clutches A and B may be engaged for the first speed range in which the second motor-pump 14 rotating clockwise rotates the ring gear 16 clockwise through gear 50, gear 48, second countershaft 46, clutch B, gear 54 and input teeth 21 of the ring gear. At the same time the clockwise rotating second motor-pump rotates the first sun gear 15 counterclockwise through gear 50, gear 44, clutch A and tubular shaft 42. Thus, power may flow in either direction between the second motor-pump 14 and the first sun gear 15 with the rotation of the first sun gear opposite to the rotation of the ring gear 16.

It is also apparent that disengaging clutch B and engaging clutch C will disconnect the second motor-pump 14 from the ring gear 16 and instead will connect the input shaft 10 to the ring gear 16 through gear 30, gear 32, first countershaft 34, clutch C, gear 45 and input teeth 21 of the ring gear for carrying out the second speed stage. Thereafter, disengaging clutch A and engaging clutch D permits the third speed range to be carried out with the second motor-pump 14 connected to the second sun gear 22 through gear 50, gear 44, clutch D and shaft 40.

FIG. 8 shows a transmission construction that may be substituted for the construction shown in FIG. 7 to carry out the modes of operation indicated by FIGS. 1 to 6. This second transmission construction is more compact than the first largely because it eliminates one of the two countershafts shown in FIG. 7. The second transmission construction has special utility for a tractor since it is what is commonly termed a drop center transmission. Most of the components of the second transmission correspond to components of the first transmission as indicated by the use of corresponding reference numbers.

Referring to FIG. 8, an input shaft 10a which is extended to provide a power take-off (PTO) carries a gear 60 in mesh with a gear 62 on a short shaft 64 to drive a first motor-pump 12a. A second motor-pump 14a is connected to the first motor-pump hydraulically for power flow therebetween as heretofore explained and the second motor-pump is connected by a gear 65 to a gear 44a which is associated with clutches A' and D' for connection selectively to the first sun gear 15a and the second sun gear 22a.

A gear 66 is freely rotatably on the input shaft 10a in constant mesh with the input teeth 21a of the ring gear 16a and the gear 66 is associated with two clutches B' and C' for selectively connecting the input shaft and the second motor-pump to the ring gear. For the purpose of releasably connecting the second motor-pump 14a to the gear 66, the gear 44a meshes with an idler gear 68 that is rotatably mounted on the shaft 64 and the idler gear in turn meshes with a gear 70 on a tubular shaft 72 that surrounds the input shaft 10a and extends to the clutch B'.

It is apparent that clutches A', B', C' and D' may be manipulated in the previously described manner for the ranges of forward speed represented by FIGS. 1–5 and for the previously described two modes of reverse operation.

Figures 10, 11:
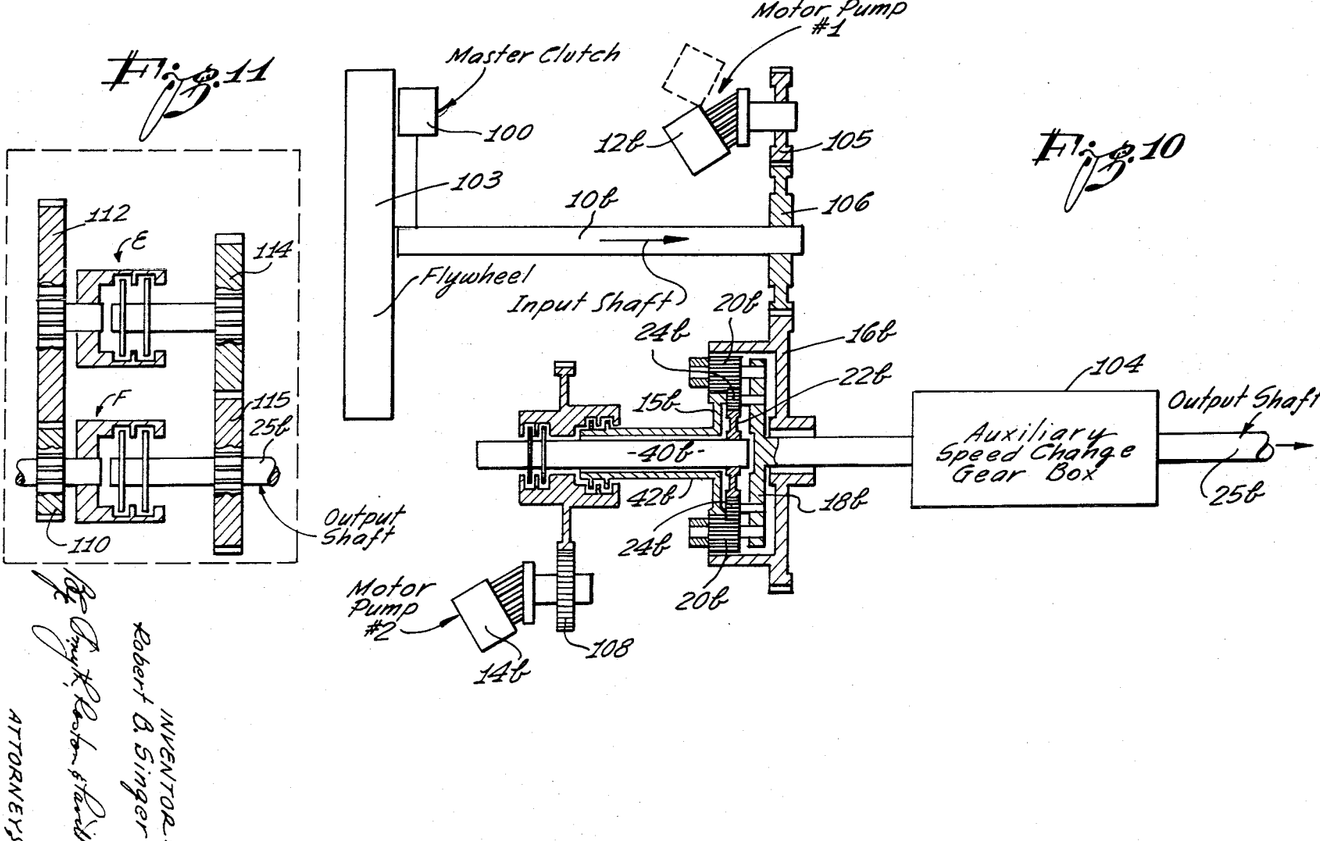
FIG. 10 is a view similar to FIGS. 7 and 8 showing how a master clutch and an auxiliary speed change gear box may be incorporated into the transmission system.
FIG. 11 is a diagrammatic view showing how, if desired, the auxiliary speed change gear box may provide two gear ratios controlled by two corresponding clutches.

FIG. 10 illustrates an embodiment of the invention which differs from the embodiment shown in FIGS. 7 and 8 essentially in the provision of a master clutch 100 between an engine flywheel 103 and the input shaft 10b and the further provision of an auxiliary speed-changing gear box 104 between the planetary gearing and the output shaft 25b. The rest of the structure shown in FIG. 10 is similar to previously described structure as indicated by the use of corresponding numerals to indicate corresponding parts, but clutches B and C are omitted.

The first motor-pump 12b is operatively connected to the input shaft 10b by gears 105 and 106, the gear 106 from the input shaft being in mesh with the ring gear 16b of the planetary gearing. The second motor-pump 14b is connected by a gear 108 to a gear 44b that is associated in the previously described manner with clutches A and D for connection to the first sun gear 15b and the second sun gear 22b, respectively.

This last embodiment of the invention takes advantage of the fact that the planetary gearing may be locked up at the transition stage between the second and third speed ranges by engaging clutches A and D, it being contemplated that the planetary gearing will be locked up a large part of the time if not most of the time during the operation of the transmission system.

Acceleration of the output shaft 25b from zero to the selected intermediate point in the overall speed range may be carried out by first adjusting the auxiliary speed-changing gear box 104 for the highest gear ratio and then after engaging the master clutch 100 manipulating the gear box by stages in the usual manner. Most of the time during the driving of a vehicle by the transmission, the planetary gearing remains locked up.

If increasing ground resistance is encountered while the planetary gearing is locked up, clutch D may be disengaged to release the second sun gear 22b and then the transmission unit may be manipulated to vary the rotation of the first sun gear 15b, the transmission then operating in under drive in the second speed range shown in FIG. 9. On the other hand, if the resistance to forward travel declines while the planetary gearing is locked up, clutch A may be disengaged from the first sun gear 15 to unlock the planetary gearing and then the transmission unit may be manipulated to vary the rotation of the second sun gear 22b for decreasing the overall gear ratio, the transmission then operating in over drive in the third speed range shown in FIG. 9.

This arrangement is unique because there are few, if any, other arrangements that offer the advantages of ring gear input with planetary carrier output for lowest tooth loads, equal torque range under drive and over drive conditions for equal swash plate angle movement in the first motor-pump, usage of a single ring gear, usage of a common planetary gear carrier, twin identical sun gears, and, finally, the lower order of power flow through the hydraulic transmission unit. The efficiency curve is favorable because it peaks at an intermediate point in the second speed range where the speeds of the two sun gears approach zero and again at a mid-point in the third speed range where the speed of the second sun gear approaches zero.

As heretofore explained with reference to FIG. 6, operation of the vehicle in reverse may be carried out by, first, engaging both clutches A and D to lock up the planetary gearing and then adjusting the swash plate of the first motor-pump 12b past center to cause reverse acceleration of the second motor-pump 14, which reverse acceleration is transmitted through the locked planetary gearing to the output shaft 25. If desired, however, a reverse speed adjustment may be incorporated in the auxiliary speed changing gear box 104 for the purpose of operating the vehicle in reverse.

FIG. 11 shows how in one practice of the invention, the auxiliary speed changing gear box 104 of FIG. 10 may incorporate a clutch E for an initial high gear ratio and may incorporate a second clutch F for 1:1 gear ratio.

In FIG. 11 the shaft from the planet gear carrier 18b has a gear 110 in mesh with a gear 112 and the gear 112 may be connected through the clutch E to a gear 114 that meshes with a gear 115 on the output shaft 25b. The clutch F may be engaged to connect the gear 110 to the gear 115 for direct drive.

Acceleration from a standing start with the master clutch disengaged is accomplished by engaging clutches A and D to lock up the planetary gearing and then engaging clutch E. The master clutch is then engaged and the engine is accelerated through an initial low speed range. The master clutch and clutch E are disengaged and then transition to direct drive is carried out by engaging clutch F and the master clutch. Thereafter whenever desired, underdrive may be developed by disengaging clutch D and manipulating the hydraulic transmission unit to vary the rotation of the first sun gear 15 and overdrive may be developed by disengaging clutch A and manipulating the hydraulic transmission unit to vary the rotation of the second sun gear 22b.

My description herein of the presently preferred practice of the invention will suggest various changes, substitutions and other departures from my disclosure within the spirit and scope of the appended claims.

I claim:

1. In a continuously variable power transmission system having a rotary input member and a rotary output member, the combination of:

planetary gearing comprising components including a first sun gear, a second sun gear, a planet gear carrier, a first set of planet gears on the planet gear carrier in mesh with the first sun gear, a second set of planet gears on the planet gear carrier in mesh with the second sun gear and in mesh with the first set of planet gears, and a ring gear in mesh with the first set of planet gears, said planet gear carrier being connected to the output member, means to releasably connect the input member to the ring gear to deliver power thereto;

a continuously variable transmission means connected to the input member for actuation thereby, said transmission means being reversible in output direction without reversal of input direction and being reversible in direction of power flow;

means to releasably connect said transmission means to said first sun gear to carry out speed changes in a given range; and means to releasably connect the transmission means to the second sun gear to actuate the second set of planet gears for a higher range of speed changes wherein the output speed is the speed transmitted to the first set of planet gears by the input member plus the speed transmitted to the second planet gears by the transmission means.

2. In a continuously variable power transmission system having a rotary input member and a rotary output member, the combination of:

differential gearing including a first sun gear, a second sun gear, a ring gear, a planet gear carrier, a first set of planet gears on the planet gear carrier in mesh with both the first sun gear and the ring gear, and a second set of planet gears on the plant gear carrier in mesh with both said first set of planet gears and said second sun gear, said planet gear carrier being connected to said output member;

means operable by the input member to drive said ring gear;

a continuously variable transmission means connected to the input member for actuation thereby, said transmission means being reversible in output direction without reversal of input direction and being reversible in direction of power flow;

connector means to releasably connect the transmission means to said first sun gear; and connector means to releasably connect the transmission means to said second sun gear, whereby with the ring gear driven by the input member and with the transmission means connected to the first sun gear with the first sun gear rotating in one direction, acceleration of the output member through a given range of speeds may be carried out by first decelerating the first sun gear to zero and then accelerating the first sun gear in the opposite rotary direction, then with the two sun gears rotating in the same direction at the same speed, said two connector means may be operated in overlapping sequence to shift the connection of the transmission means from the first sun gear to the second sun gear without interrupting the power flow to the output member, and then the output member may be accelerated through a higher range of speeds by first decelerating the second sun gear to zero and then accelerating the second sun gear in said one rotary direction.

3. A combination as set forth in claim 2 in which said continuously variable transmission means comprises a generator means that is reversible to function as a motor means and a rotor means that is reversible to function as a generator means.

4. A combination as set forth in claim 2 in which said transmission means comprises two hydraulically interconnected hydraulic means each of which comprises a pump capable of operation as a motor.

5. A combination as set forth in claim 2 in which said first sun gear is mounted on a first shaft and said second sun gear is mounted on a second shaft, one of the two shafts being tubular and enclosing at least a portion of the other shaft;

and which includes a gear concentric to the two shafts, said transmission means being connected to said gear;

and which includes two clutches, one to releasably connect said gear to the first shaft, the other to releasably connect said gear to the second shaft.

6. A combination as set forth in claim 5 in which said other shaft extends beyond the end of the tubular shaft and said gear surrounds said other shaft adjacent the end of the tubular shaft.

7. In a continuously variable power transmission system having a rotary input member and a rotary output member, the combination of:

differential gearing including a first sun gear, a second sun gear, a ring gear, a planet gear carrier, a first set of planet gears on the planet gear carrier in mesh with both the first sun gear and the ring gear, and a second set of planet gears on the planet gear carrier in mesh with both said first set of planet gears and said second sun gear, said planet gear carrier being connected to said output member;

a continuously variable transmission means connected to the input member for actuation thereby, said transmission means being reversible in output direction without reversal of input direction and being reversible in direction of power flow;

first connector means to releasably connect the transmission means to said first sun gear;

second connector means to releasably connect the transmission means to the ring gear;

third connector means to releasably connect the input member to the ring gear; and fourth connector means to releasably connect the transmission means to said second sun gear, whereby with said transmission means connected to the first sun gear by the first connector means and connected to the ring gear by the second connector means, a first low stage of output speeds may be carried out by adjusting the transmission means to progressively accelerate the first sun gear in one rotary direction, with the input member synchronized with the ring gear, a transition to a second stage of output speeds without interruption in power flow to the output member may be made by operating said second and third connector means in overlapping sequence to connect the input member to the ring gear and to disconnect the transmission means from the ring gear, then a second stage of output speed may be carried out by adjusting the transmission means first to decelerate the first sun gear and then to accelerate the first sun gear in the opposite rotary direction, then with the two sun gears synchronized, a transition to a third stage of output speeds without interruption of power flow to the output member may be carried out by operating the fourth and first connector means in overlapping sequence to shift the connection of the transmission means from the first sun gear to the second sun gear, and then the third stage of output speeds may be carried out by first decelerating the second sun gear to zero and then accelerating the second sun gear in said one rotary direction.

8. A combination as set forth in claim 7 in which said transmission unit comprises a first reversible hydraulic motor-pump and a second reversible motor-pump hydraulically connected thereto.

9. A combination as set forth in claim 8 which includes a first countershaft connected by gearing both to said input member and to said first motor-pump;

and which includes a second countershaft connected by gearing to said second motor-pump, said first connector means being effective between the second motor-pump and said first sun gear, said second connector means being effective between said second countershaft and the ring gear, said third connector means being effective between the first countershaft and said ring gear, the fourth connector means being effective between the second motor-pump and the second sun gear.

10. A combination as set forth in claim 9 which includes a first shaft united with the first sun gear and a second shaft united with the second sun gear, one of said shafts being tubular and enclosing at least a portion of the other shaft;

and which includes a gear concentric to the two shafts and operatively connected to the second motor-pump, said first connector means being effective between said gear and one of the two shafts, said fourth connector means being effective between said gear and the other of the two shafts.

11. A combination as set forth in claim 10 in which said other of the two shafts extends beyond the end of the tubular shaft;

and in which said gear is rotatably mounted on said other of the two shafts adjacent the end of the tubular shaft.

12. In a continuously variable transmission system having an input shaft and an output shaft, the combination of:

a first reversible hydraulic motor-pump operatively connected to the input shaft for actuation thereby;

a second reversible hydraulic motor-pump hydraulically connected to the first motor-pump for power flow between the two motor-pumps;

differential gearing including a first sun gear, a second sun gear, a ring gear, a planet gear carrier, a first set of planet gears on the planet gear carrier in mesh with both the first sun gear and the ring gear, and a second set of planet gears on the planet gear carrier in mesh with both first set of planet gears and said second sun gear, said planet gear carrier being connected to said output shaft for actuation thereof;

a first shaft united with the first sun gear and a second shaft united with the second sun gear, one of said shafts being tubular and enclosing at least a portion of the other shaft;

means including a first pair of clutches to connect the second motor-pump to said first and second shafts selectively; and means including a second pair of clutches to connect the ring gear to the input shaft and the second motor-pump selectively.

13. A combination as set forth in claim 12 which includes a gear associated with said first pair of clutches and actuated by said second motor-pump for connection by said first pair of clutches to said first and second shafts selectively;

and which includes a gear means operatively connected to the ring gear for connection by said second pair of clutches to the input shaft and the second motor-pump selectively.

14. A combination as set forth in claim 13 in which said gear means is a single gear rotatably mounted on the input shaft;

and which includes a second tubular shaft operatively connected to the second motor pump and surrounding the input shaft, said second pair of clutches connecting said single gear to said second tubular shaft and to the input shaft selectively.

15. A combination as set forth in claim 14 in which said single gear is in mesh with external teeth of the ring gear;

and in which the second motor-pump is connected to the second tubular shaft by an idler gear in mesh with a gear on the second tubular shaft.

16. A combination as set forth in claim 15 in which the second motor pump is connected to said idler gear by means of said gear that is associated with the first pair of clutches.

17. A combination as set forth in claim 1 in which at a transition stage between the two speed ranges, the planetary gearing rotates as a whole with no relative rotation among its components, whereby both said releasable connecting means may be made effective at the transition stage to lock up the planetary gearing to cause the planetary gearing to function solely as means for directly mechanically connecting the rotary input member to the rotary input member to the rotary output member.

18. A combination as set forth in claim 17 which includes a speed-changing gear box incorporated into the transmission system in series with one of said input and output members to provide different overall gear ratios when the planetary gearing is locked up.

19. A combination as set forth in claim 18 in which said speed changing gear box incorporates a first clutch for operation at a high gear ratio and a second clutch for operation at a lower gear ratio.

20. A combination as set forth in claim 19 in which the second clutch is effective for a gear ratio of 1:1.

21. A combination as set forth in claim 18 in which the speed-changing gear box is interposed between the planetary gearing and the output member.

22. A combination as set forth in claim 18 which includes a master clutch.

23. A method of operating planetary gearing for continuous variable power transmission from an input member to an output member, wherein the planetary gearing includes a first sun gear, a second sun gear, a planet gear carrier connected to said output member, a first set of planet gears on the planet gear carrier in mesh with the first sun gear, a second set of planet gears on the planet gear carrier in mesh with the second sun gear and in mesh with the first set of planet gears, and a ring gear in mesh with the first set of planet gears, said method being characterized by the use of a continuously variable transmission unit driven by said input member that is reversible in output direction without reversal of input direction and is reversible in direction of power flow, said method including the steps of:
connecting the imput member to the ring gear;
carrying out a given range of speeds by connecting the transmission unit to the first sun gear and adjusting the transmission unit to progressively change the rotation of the first sun gear;
making a transition from said given range to a higher range of speeds by, first, synchronizing both sun gears and the ring gear, second connecting the transmission unit to the second sun gear while the transmission unit is still connected to the first sun gear, and, third, disconnecting the transmission unit from the first sun gear; and
then carrying out the higher range of speeds by progressively adjusting the transmission unit to progressively change the rotation of the second sun gear.

24. A method of operating planetary gearing for continuous variable power transmission from an input member to an output member,
wherein the differential mechanism includes a first sun gear, a second sun gear, a planet gear carrier connected to said output member, a first set of planet gears on the planet gear carrier in mesh with the first sun gear, a second set of planet gears on the planet gear carrier in mesh with the second sun gear and in mesh with the first set of planet gears, and a ring gear in mesh with the first set of planet gears,
said method being characterized by the use of a continuously variable transmission unit driven by said input member that is reversible in output direction without reversal of input direction and is reversible in direction of power flow,
said method including the steps of:
connecting the input member solely to the transmission unit to carry out a first range of speeds;
connecting the transmission unit to both said first sun gear and said ring gear to carry out the first range of speeds;
carrying out the first range of speeds by progressively adjusting the transmission unit to progressively change by rotation imparted to the first sun gear;
making a transition from said first range of speeds to a second range of speeds by, first, synchronizing the ring gear with the input member, second, connecting the input member to the synchronized ring gear, and, third, disconnecting the transmission unit from the ring gear;
carrying out said second range of speeds by progressively adjusting the transmission unit to progressively change the rotation of the first sun gear;
making a transition from said second range of speeds to a third range of speeds by, first, synchronizing both sun gears and the ring gear, second, connecting the transmission unit to the second sun gear while the transmission unit is still connected to the first sun gear, and, third, disconnecting the transmission unit from the first sun gear;
then carrying out the third range of speeds by progressively adjusting the transmission unit to progressively change the rotation of the second gear.

25. A method of operating planetary gearing for continuous variable power transmission from an input member to an output member,
wherein the differential mechanism includes a first sun gear, a second sun gear, a planet gear carrier connected to said output member, a first set of planet gears on the planet gear carrier in mesh with the first sun gear, a second set of planet gears on the planet gear carrier in mesh with the second sun gear and in mesh with the first set of planet gears and a ring gear in mesh with the first set of planet gears,
said method being characterized by the use use of a continuously variable transmission unit driven by said input member that is reversible in output direction without reversal of input direction and is reversible in direction of power flow,
said method including the steps of:
providing speed-change gearing between the planetary gearing and one of said input and output members;
operatively connecting the input member to the ring gear;
locking up the planetary gearing to cause the planetary gearing to rotate as a unit;
initially manipulating the speed-change gearing to accelerate the output member to a given speed while the planetary gearing is locked up; and
thereafter increasing or decreasing the overall gear ratio between the input member and the output member by unlocking the planetary gearing and progressively varying the rotation of the first sun gear to increase the overall gear ratio or progressively varying the rotation of the second sun gear to decrease the overall gear ratio.

26. A method as set forth in claim 25 in which the step of locking up the planetary gearing is carried out by connecting the transmission unit to both the sun gears,
increase in the overall gear ratio being developed by releasing the second sun gear from the transmission unit and progressively varying the rotation of the first sun gear by the transmission unit,
decrease in the overall gear ratio being developed by releasing the first sun gear from the transmission unit and progressively varying the rotation of the second sun gear by the transmission unit.

27. A method as set forth in claim 25 in which the speed change gearing is manipulated to establish direct drive between the input member and the output member at said given speed, when the planetary gearing is locked up.

References Cited
UNITED STATES PATENTS

| | | | |
|---|---|---|---|
| 2,808,737 | 8/1957 | Bullard | 74—687 |
| 3,199,376 | 8/1965 | DeLalio | 74—687 X |
| 3,212,358 | 10/1965 | DeLalio | 74—687 |
| 3,306,129 | 2/1967 | DeLalio | 74—687 |
| 3,427,899 | 2/1969 | Gunderson et al. | 74—687 |
| 3,433,095 | 3/1969 | Tuck | 74—687 |

CARLTON R. CROYLE, Primary Examiner

T. C. PERRY, Assistant Examiner